(12) United States Patent
Ishibashi

(10) Patent No.: US 12,043,496 B2
(45) Date of Patent: Jul. 23, 2024

(54) DEVICE AND METHOD FOR DETECTING VERTICAL TEAR IN CONVEYOR BELT

(71) Applicant: THE YOKOHAMA RUBBER CO., LTD., Tokyo (JP)

(72) Inventor: Yusuke Ishibashi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 62 days.

(21) Appl. No.: 17/920,206

(22) PCT Filed: Mar. 4, 2021

(86) PCT No.: PCT/JP2021/008380
§ 371 (c)(1),
(2) Date: Oct. 20, 2022

(87) PCT Pub. No.: WO2022/004055
PCT Pub. Date: Jan. 6, 2022

(65) Prior Publication Data
US 2023/0159278 A1 May 25, 2023

(30) Foreign Application Priority Data
Jul. 2, 2020 (JP) ................................ 2020-114883

(51) Int. Cl.
*B65G 43/02* (2006.01)
*B65G 15/08* (2006.01)
(52) U.S. Cl.
CPC ............. *B65G 43/02* (2013.01); *B65G 15/08* (2013.01)

(58) Field of Classification Search
None
See application file for complete search history.

(56) References Cited

U.S. PATENT DOCUMENTS

| | | | | |
|---|---|---|---|---|
| 3,731,786 A | * | 5/1973 | Nagata | B65G 43/02 198/810.02 |
| 4,621,727 A | * | 11/1986 | Strader | B65G 43/02 340/676 |
| 4,854,446 A | * | 8/1989 | Strader | B65G 43/02 340/676 |

(Continued)

FOREIGN PATENT DOCUMENTS

| | | |
|---|---|---|
| JP | S55-127390 U | 9/1980 |
| JP | S60-15312 A | 1/1985 |

(Continued)

*Primary Examiner* — Kavel Singh
(74) *Attorney, Agent, or Firm* — Carrier, Shende & Associates P.C.; Joseph P. Carrier; Jeffrey T. Gedeon

(57) ABSTRACT

An embedded body including, at one end portion of a coaxial cable, one side antenna unit and an IC tag that is passive and connected to the one side antenna unit, and another side antenna unit at the other end portion of the coaxial cable is embedded in a conveyor belt. The one side antenna unit and the IC tag, and the other side antenna unit disposed with an interval in a width direction and the coaxial cable is embedded extending in the width direction. A calculation unit determines whether a detector has received a radio wave emitted from the IC tag through the coaxial cable and the other side antenna unit in response to a radio wave emitted from the detector, and then whether a vertical tear has been generated in the conveyor belt based on the determination result.

7 Claims, 13 Drawing Sheets

(56) References Cited

U.S. PATENT DOCUMENTS

| | | | | |
|---|---|---|---|---|
| 6,352,149 | B1* | 3/2002 | Gartland | B65G 43/02 |
| | | | | 198/810.02 |
| 9,221,610 | B2* | 12/2015 | Enshu | B65G 43/02 |
| 9,811,809 | B2* | 11/2017 | Sakuragi | B65G 43/02 |
| 10,196,216 | B2* | 2/2019 | Sakuragi | B65G 15/08 |
| 10,569,488 | B2* | 2/2020 | Hou | B65G 15/36 |
| 10,745,207 | B2* | 8/2020 | Hou | B65G 15/34 |
| 2004/0149049 | A1* | 8/2004 | Kuzik | B65G 43/02 |
| | | | | 73/862.453 |
| 2022/0024695 | A1* | 1/2022 | Enshu | B65G 15/32 |

FOREIGN PATENT DOCUMENTS

| | | | |
|---|---|---|---|
| JP | H09-175628 A | | 7/1997 |
| JP | 2001-203605 A | | 7/2001 |
| JP | 2005335939 A | * | 12/2005 |
| JP | 2016-204070 A | | 12/2016 |

* cited by examiner

DEVICE AND METHOD FOR DETECTING VERTICAL TEAR IN CONVEYOR BELT

TECHNICAL FIELD

The present invention relates to a device and method for detecting a vertical tear in a conveyor belt and particularly relates to a detection device and method that allow accurate detection of generation of a vertical tear in a conveyor belt while having high versatility at low cost.

BACKGROUND ART

A conveyor belt that runs hung around a conveyor device transports various conveyed objects to conveying destinations. Since various conveyed objects are fed into the conveyor belt, a crack (so-called vertical tear) extending in a longitudinal direction of the conveyor belt may be generated due to the conveyed objects or the like. Various devices that detect such a vertical tear in the conveyor belt have been proposed.

Conventionally, for example, loop coils embedded in the conveyor belt and a detection device disposed near the conveyor belt are used to detect a vertical tear generated in the conveyor belt (see Patent Document 1). A transmitter of the detection device emits high frequency waves to form a high frequency magnetic field, in which an induced current flows through the loop coils. Induced electromotive force is generated by the induced current in a reception unit of the detection device. As a result, whether a damage of the loop coils passing the placement position of the detection device is present is determined based on whether induced electromotive force is generated in the reception unit, and in a case where the loop coils are damaged, it can be determined that a vertical tear has been generated.

The loop coils are special products (exclusive parts) and are expensive because they are not general-purpose parts. The detection device that emits high frequency waves and detects induced electromotive force is also expensive. In addition, since the loop coils are expensive, it is difficult to sufficiently reduce an embedding pitch with respect to the conveyor belt, which is disadvantageous in accurately detecting generation of a vertical tear. Accordingly, there is room for improvement in accurately detecting whether a vertical tear has been generated in the conveyor belt while providing high versatility at low cost.

CITATION LIST

Patent Literature

Patent Document 1: JP 2016-204070 A

SUMMARY OF INVENTION

Technical Problem

An object of the present invention is to provide a device and method for detecting a vertical tear in a conveyor belt which allow accurate detection of whether a vertical tear has been generated in a conveyor belt while having high versatility at low cost.

Solution to Problem

In order to achieve the aforementioned object, a detection device for a vertical tear in a conveyor belt, according to an aspect of the present invention, includes an embedded body embedded in the conveyor belt, a detector configured to wirelessly communicate with the embedded body without making contact with the conveyor belt, and a calculation unit connected to the detector. In the detection device, the embedded body includes an IC tag being passive, one side antenna unit connected to the IC tag, a coaxial cable including one end portion connected to the one side antenna unit, and the other side antenna unit connected to the other end portion of the coaxial cable; the IC tag and the one side antenna unit, and the other side antenna unit are disposed with an interval in a width direction of the conveyor belt and the coaxial cable extends in the width direction of the conveyor belt; and a radio wave is emitted from the detector toward the other side antenna unit, the calculation unit determines whether the detector has received a radio wave emitted, in response to the emitted radio wave, from the IC tag through the coaxial cable and the other side antenna unit, and then whether a vertical tear has been generated in the conveyor belt in a region where the coaxial cable is embedded is detected based on the determination result.

A method for detecting a vertical tear in a conveyor belt, according to an aspect of the present invention, uses an embedded body embedded in the conveyor belt, a detector configured to wirelessly communicate with the embedded body without making contact with the conveyor belt, and a calculation unit connected to the detector. In the method, the embedded body includes one side antenna unit connected to one end portion of a coaxial cable, the other side antenna unit connected to the other end portion of the coaxial cable, and an IC tag that is passive and connected to the one side antenna unit; and the one side antenna unit and the IC tag, and the other side antenna unit are disposed with an interval in a width direction of the conveyor belt and the coaxial cable extends in the width direction of the conveyor belt. The detection method includes: emitting a radio wave from the detector toward the other side antenna unit; determining by the calculation unit whether the detector has received a radio wave emitted, in response to the emitted radio wave, from the IC tag through the coaxial cable and the other side antenna unit; and detecting based on the determination result whether a vertical tear has been generated in the conveyor belt in a region where the coaxial cable is embedded.

Advantageous Effects of Invention

According to an aspect of the present invention, the embedded body has a simple structure including the passive IC tag, the coaxial cable, and the one side antenna unit and the other side antenna unit connected to both end portions of the coaxial cable. Accordingly, the embedded body can be formed of general-purpose parts, which is advantageous to reduce costs. Further, the detector may have specifications that allow wireless communication with the embedded body and thus can be formed of general-purpose parts, which is advantageous to reduce costs.

Furthermore, when the coaxial cable is embedded in the position in which a vertical tear is generated in the conveyor belt, the coaxial cable breaks. Thus, even when a radio wave is emitted from the detector toward the other side antenna unit, a radio wave is not emitted from the IC tag in response to the emitted radio wave. As a result, whether a vertical tear has been generated can be determined based on whether the detector has received the radio wave emitted through the other side antenna unit. In association with the cost reduction of the embedded body, an embedding pitch of the embedded body with respect to the conveyor belt can be sufficiently decreased compared to a case of a conventional loop antenna or the like, which is advantageous to accurately detect whether a vertical tear has been generated.

DESCRIPTION OF EMBODIMENTS

Figure 1:
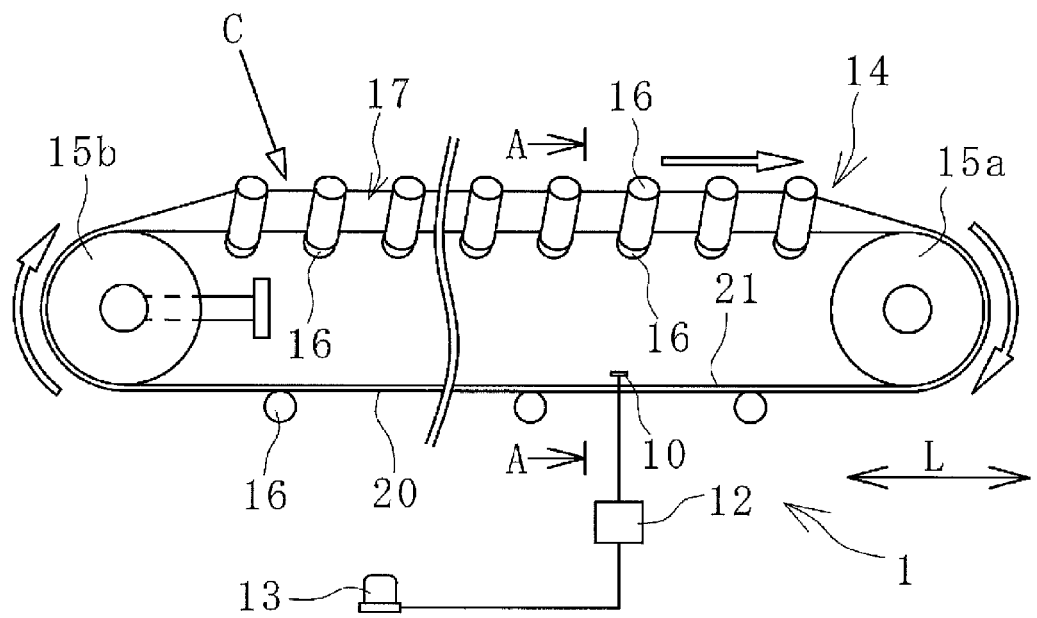
FIG. 1 is an explanatory diagram illustrating a detection device for a vertical tear in a conveyor belt of an embodiment of the present invention, which is disposed on a conveyor device in a side view of the conveyor belt.

A detection device and method for a vertical tear in a conveyor belt of the present invention will be described below based on embodiments illustrated in the drawings.

A detection device 1 for a vertical tear in a conveyor belt of the present invention, illustrated in FIGS. 1 to 6 (hereinafter, referred to as a detection device 1), is placed on a conveyor device 14. A conveyor belt 17 is mounted between a pair of pulleys 15a, 15b of the conveyor device 14. The conveyor belt 17 is supported by a number of support rollers 16 between the pulleys 15a, 15b. In the drawings, an arrow L indicates a longitudinal direction of the conveyor belt 17, and an arrow W indicates a width direction of the conveyor belt 17.

The conveyor belt 17 is formed integrally of an upper cover rubber 20, a lower cover rubber 21, and a core layer 18 disposed between the upper cover rubber 20 and the lower cover rubber 21. The core layer 18 includes a plurality of steel cords 19 disposed side by side in the width direction W and extending in the longitudinal direction L. The core layer 18 is not limited to the steel cords 19 and may be a fiber layer formed of canvas or the like. The conveyor belt 17 includes other members as necessary.

On the carrier side of the conveyor device 14, the lower cover rubber 21 of the conveyor belt 17 is supported by the support rollers 16, and thus a central portion in the width direction W of the conveyor belt 17 is formed into a trough shape protruding downward. A conveyed object C is fed onto an upper surface of the upper cover rubber 20 to be transported. On the return side of the conveyor device 14, the upper cover rubber 20 of the conveyor belt 17 is supported in a flat state by the support rollers 16.

The detection device 1 detects the generation of a crack (so-called vertical tear) extending in the longitudinal direction L in the conveyor belt 17. The detection device 1 includes embedded bodies 2 embedded in the conveyor belt 17, a detector 10, and a calculation unit 12. In this embodiment, a warning device 13 is further provided. The warning device 13 may be optionally provided.

A number of the embedded bodies 2 are embedded at intervals in the longitudinal direction L. Wireless communication is performed between each of the embedded bodies 2 and the detector 10. The frequency of radio waves used in wireless communication in the present invention is mainly an UHF band (different from country to country, but in the range of 860 MHz or higher and 930 MHz or lower; 915 MHz or higher and 930 MHz or lower in Japan), and an HF band (13.56 MHz) can also be used.

Figure 7:
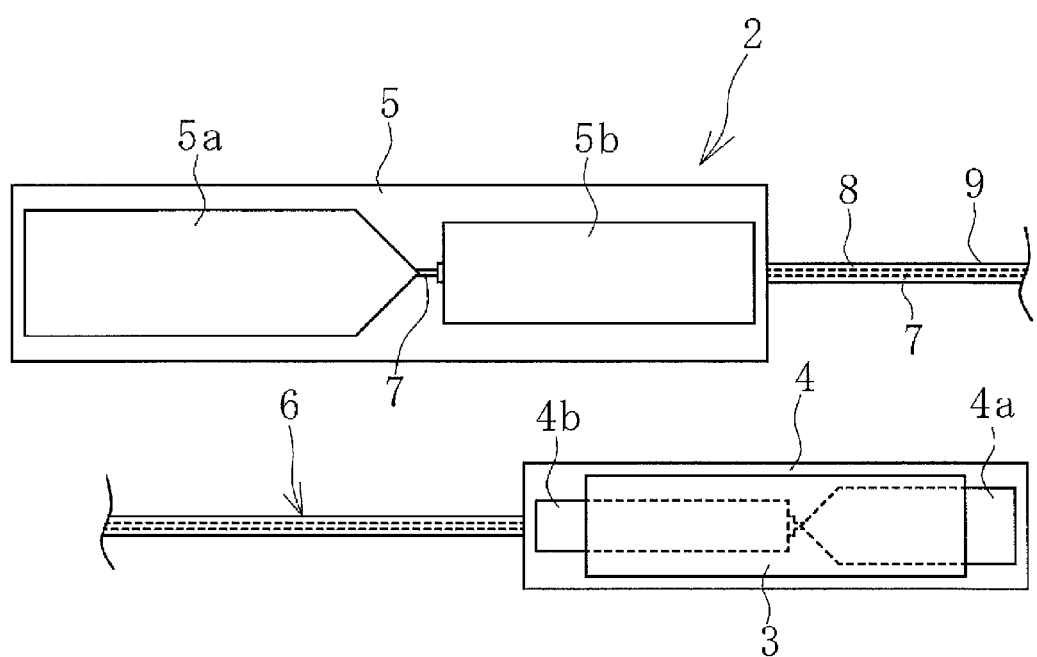
FIG. 7 is an explanatory diagram illustrating an embedded body of FIG. 6 in a plan view.
Figure 8:
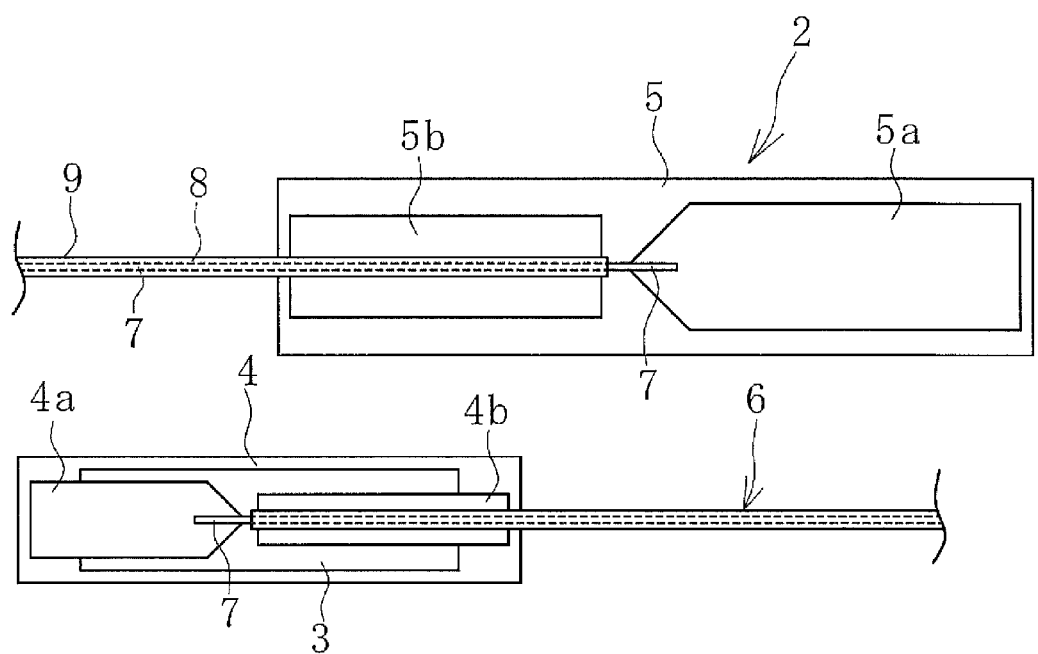
FIG. 8 is an explanatory diagram illustrating the embedded body of FIG. 7 in a bottom view.
Figure 9:
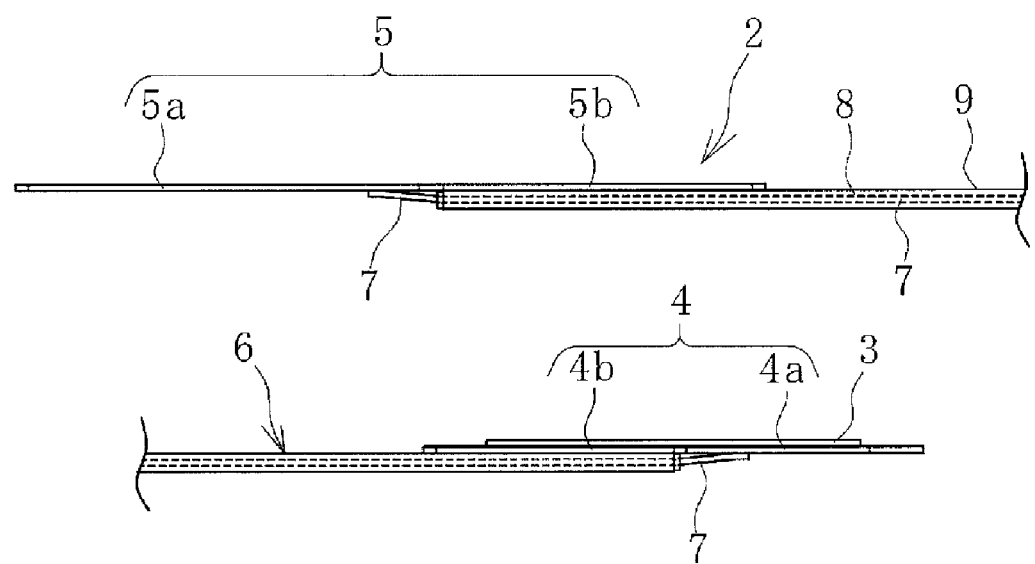
FIG. 9 is an explanatory diagram illustrating the embedded body of FIG. 7 in a side view.
Figure 10:
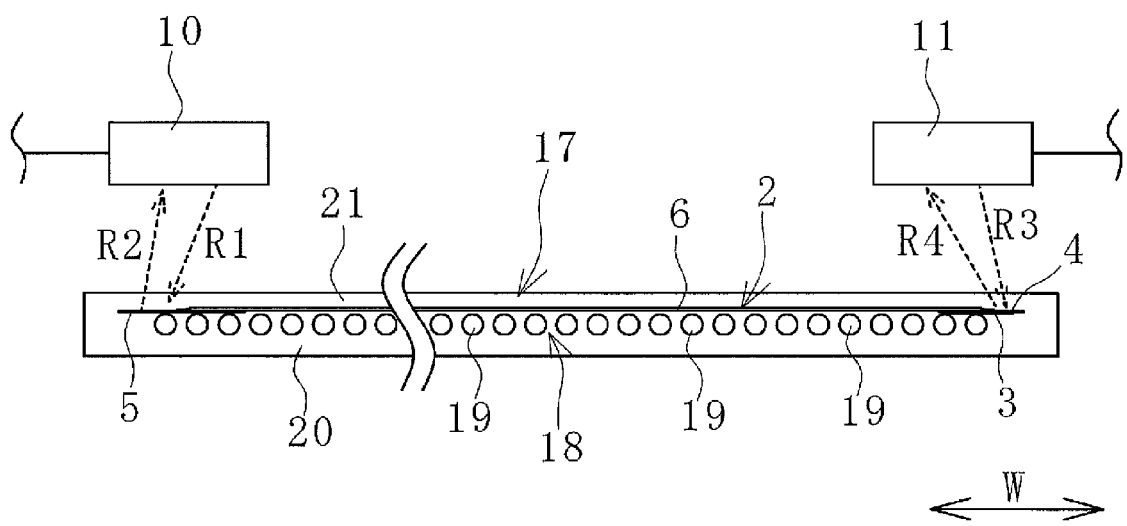
FIG. 10 is an explanatory diagram illustrating another embodiment of the detection device in a cross-sectional view of the conveyor belt.
Figure 11:
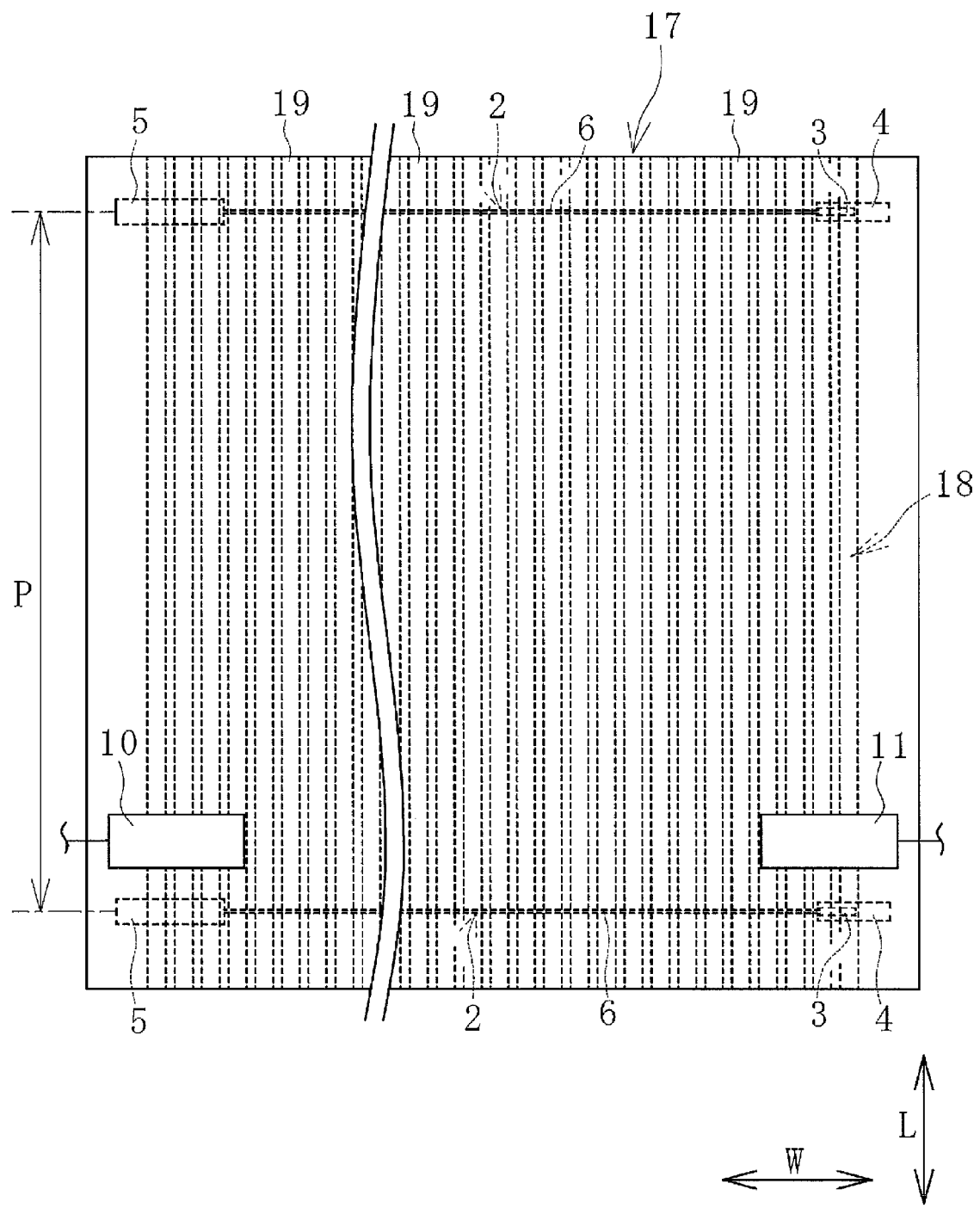
FIG. 11 is an explanatory diagram illustrating the conveyor belt of FIG. 10 in a plan view.

As illustrated in FIGS. 7 to 9, the embedded body 2 includes an IC tag 3 that is passive, one side antenna unit 4 connected to the IC tag 3, the other side antenna unit 5, and a coaxial cable 6. The one side antenna unit 4 is connected to one end portion of the coaxial cable 6, and the other side antenna unit 5 is connected to the other end portion of the coaxial cable 6. In this embodiment, the embedded body 2 is embedded in the lower cover rubber 21, but may be embedded in the upper cover rubber 20. In order to protect the embedded body 2 from the conveyed object C, the embedded body 2 is preferably embedded in the lower cover rubber 21 rather than the upper cover rubber 20.

The commonly distributed specifications are adopted for the IC tag 3, and for example, an RFID tag can be used. The size of the IC tag 3 is preferably as small as possible; for example, a length of 15 mm or less and more preferably 10 mm or less, a width of 60 mm or less and more preferably 50 mm or less, and a thickness of 1 mm or less and more preferably 0.5 mm or less. In addition, the IC tag 3 having a heat resistance temperature of approximately 200° C. is used.

In addition to information specific to the tag such as an identification number thereof, any other necessary information is stored in the IC tag 3. The IC tag 3 is disposed overlapping the one side antenna unit 4 and is connected to the one side antenna unit 4.

The one side antenna unit 4 includes antenna plates 4a, 4b made of metal and formed on a substrate. The antenna plates 4a, 4b are disposed separated from each other. The other side antenna unit 5 includes antenna plates 5a, 5b made of metal and formed on a substrate. The antenna plates 5a, 5b are disposed separated from each other.

The size of the one side antenna unit 4 is preferably as small as possible; for example, a length of 15 mm or less and more preferably 10 mm or less, a width of 60 mm or less and more preferably 50 mm or less, and a thickness of 1 mm or less and more preferably 0.5 mm or less. The size of the other side antenna unit 5 is preferably as small as possible; for example, a length of 15 mm or less and more preferably 10 mm or less, a width of 150 mm or less and more preferably 120 mm or less, and a thickness of 1 mm or less and more preferably 0.5 mm or less. In this embodiment, the one side antenna unit 4 is smaller than the other side antenna unit 5 and has an area of approximately 50% of that of the other side antenna unit 5, but may have an area equivalent to that of the other side antenna unit 5.

The commonly distributed specifications are adopted for the coaxial cable 6. The coaxial cable 6 includes a core wire 7 serving as an inner conductor, an insulating layer 8 covering the periphery of the core wire 7, and an outer conductor layer 9 covering the periphery of the insulating layer 8. The outer diameter of the coaxial cable 6 is, for example, approximately 1 mm or more and 3 mm or less.

The core wire 7 is connected to one antenna plate 4a by soldering or the like at one end portion of the coaxial cable 6, and is not connected to the other antenna plate 4b. Also, the outer conductor layer 9 is connected to the other antenna plate 4b by soldering or the like, and is not connected to one antenna plate 4a. The core wire 7 is connected to one antenna plate 5a by soldering or the like at the other end portion of the coaxial cable 6, and is not connected to the other antenna plate 5b. Also, the outer conductor layer 9 is connected to the other antenna plate 5b by soldering or the like, and is not connected to one antenna plate 5a. The exposed surface of each of the one side antenna unit 4 and the other side antenna unit 5 is covered by an insulator.

Figure 6:
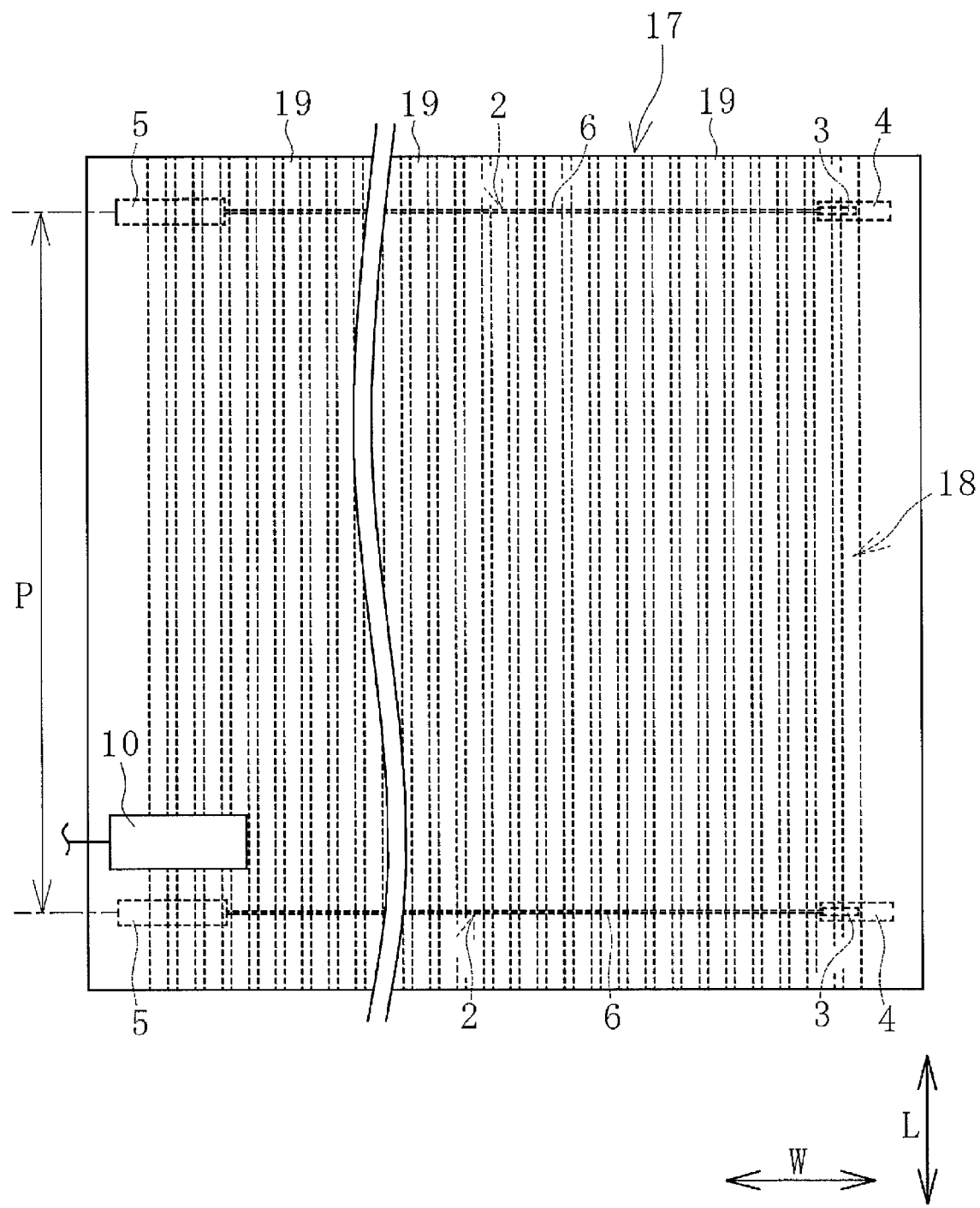
FIG. 6 is an explanatory diagram illustrating the conveyor belt of FIG. 3 in a plan view.

The IC tag 3 and the one side antenna unit 4 are embedded in one end portion in the width direction W of the conveyor belt 17, and the other side antenna unit 5 is embedded in the other end portion in the width direction W of the conveyor belt 17. The IC tag 3 and the one side antenna unit 4 are disposed with an interval from the other side antenna unit 5 in the width direction W. The coaxial cable 6 is embedded in the conveyor belt 17 while extending in the width direction W. In this embodiment, as illustrated in FIG. 6, the coaxial cable 6 extends parallel to the width direction W and extends substantially at an inclination angle of 0° with respect to the width direction W. Each coaxial cable 6 is preferably extended to cover the entire width of the core layer 18.

In manufacturing the conveyor belt 17, the embedded bodies 2 are disposed in the lower cover rubber 21 having not been vulcanized or the upper cover rubber 20 having not been vulcanized, in a molding step; thereafter, through a vulcanization step, the embedded bodies 2 embedded in the conveyor belt 17 are integrated with the lower cover rubber 21 or the upper cover rubber 20. In order to allow the one side antenna unit 4 and the other side antenna unit 5 to be firmly adhered to the lower cover rubber 21 or the upper cover rubber 20 into which the antenna units are to be embedded, a fiber layer or the like immersed in dipping liquid is interposed between an adhering surface of the lower cover rubber 21 or the upper cover rubber 20 and the antenna units in the molding step of the conveyor belt 17.

The embedded bodies 2 are embedded at intervals of, for example, 5 m or more and 20 m or less in the longitudinal direction L. In other words, an embedding pitch P of the embedded bodies 2 is preferably in the range of 5 m or more and 20 m or less, and is more preferably an equal pitch. It is appropriate that the embedding pitch P of the embedded bodies 2 is approximately 10 m in consideration of detection accuracy of a vertical tear and costs. Note that in the drawings, the embedding pitch P is illustrated shorter than the real embedding pitch P.

The detector 10 is disposed at a position near the conveyor belt 17 to wirelessly communicate with the embedded bodies 2 without making contact with the conveyor belt 17. The detector 10 includes a transmission unit of a radio wave R1 and a reception unit of a radio wave R2. The detector 10 emits the radio wave R1 toward the other side antenna unit 5. Additionally, the detector 10 receives the radio wave R2 emitted from the other side antenna unit 5 in response to the radio wave R1 and acquires information that is stored in the IC tag 3 and is to be transmitted with the radio wave R2.

The commonly distributed specifications that allow wireless communication with a passive RFID tag or the like are adopted for the detector 10. Thus, the IC tag 3 and the detector 10 form a Radio Frequency IDentification (RFID) system.

In this embodiment, the detector 10 is disposed on the return side of the conveyor device 14, but may be disposed on the carrier side. The distance between the detector 10 and the other side antenna unit 5 when the other side antenna unit 5 comes closest to the detector 10 is set, for example, 1 m or less. In other words, the detector 10 is preferably placed at a position where the distance between the detector 10 and the other side antenna unit 5 is 1 m or less when the other side antenna unit 5 passes in front of the detector 10.

The calculation unit 12 is connected by wire or wirelessly to the detector 10. A computer or the like is used as the calculation unit 12. Information acquired by the detector 10 is input to the calculation unit 12. In addition, embedded position data (at least position data in the longitudinal direction L) of each IC tag 3 in the conveyor belt 17 is stored in the calculation unit 12.

The warning device 13 notifies its surroundings of generation of a vertical tear. Examples of the warning device 13 can include an alarm, a warning lamp, and an alarm indicator. The warning device 13 is connected by wire or wirelessly to the calculation unit 12, and the operation of the warning device 13 is controlled by the calculation unit 12. When it is determined that a vertical tear has been generated, the calculation unit 12 activates the warning device 13.

Next, an example of a procedure of a method for detecting whether a vertical tear has been generated, by using the detection device 1 will be described.

Figure 2:
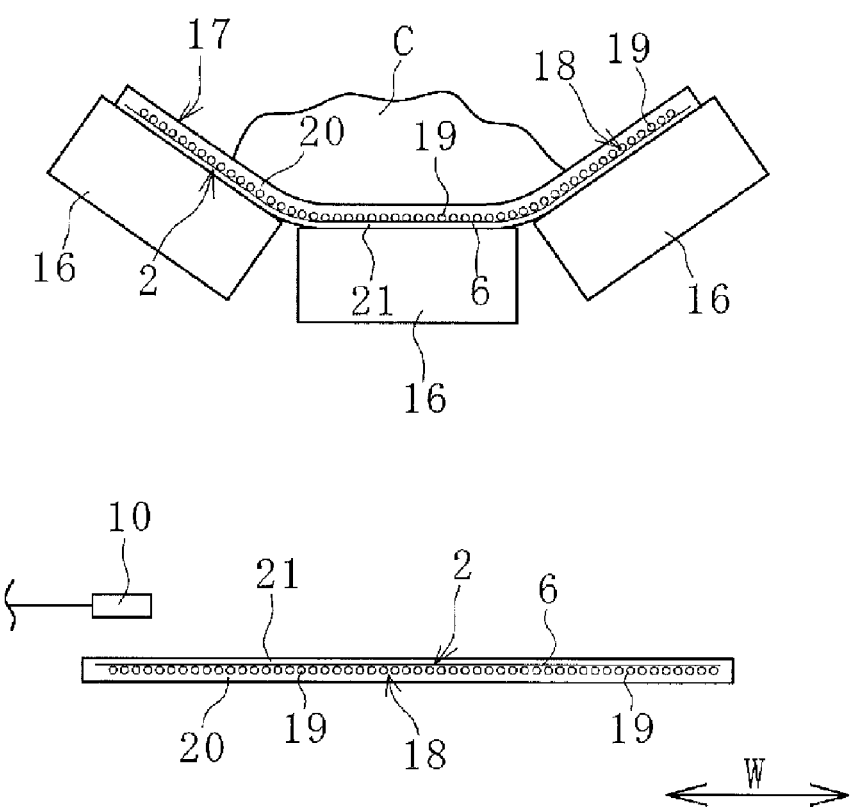
FIG. 2 is a cross-sectional view taken along A-A of FIG. 1.
Figure 3:
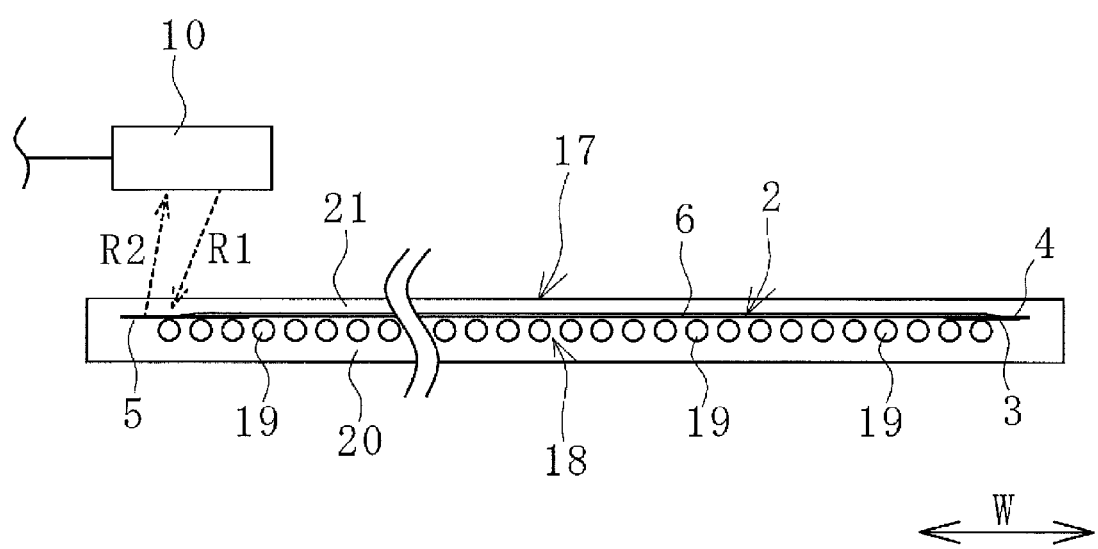
FIG. 3 is an enlarged explanatory diagram illustrating the conveyor belt of FIG. 1 in a cross-sectional view.
Figure 4:
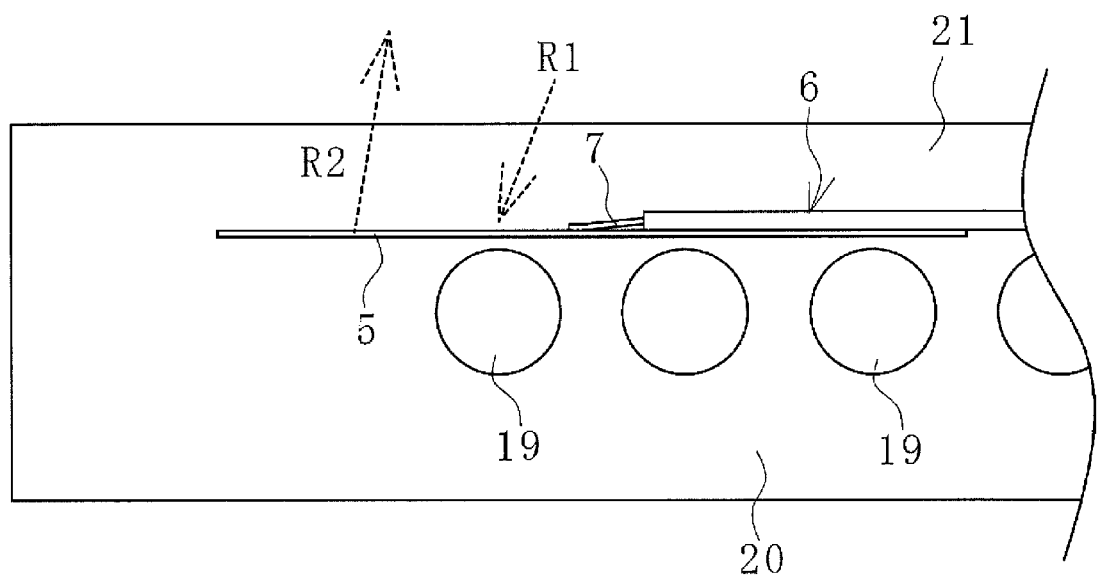
FIG. 4 is an enlarged view of the surroundings of the other side antenna unit of FIG. 3.
Figure 5:
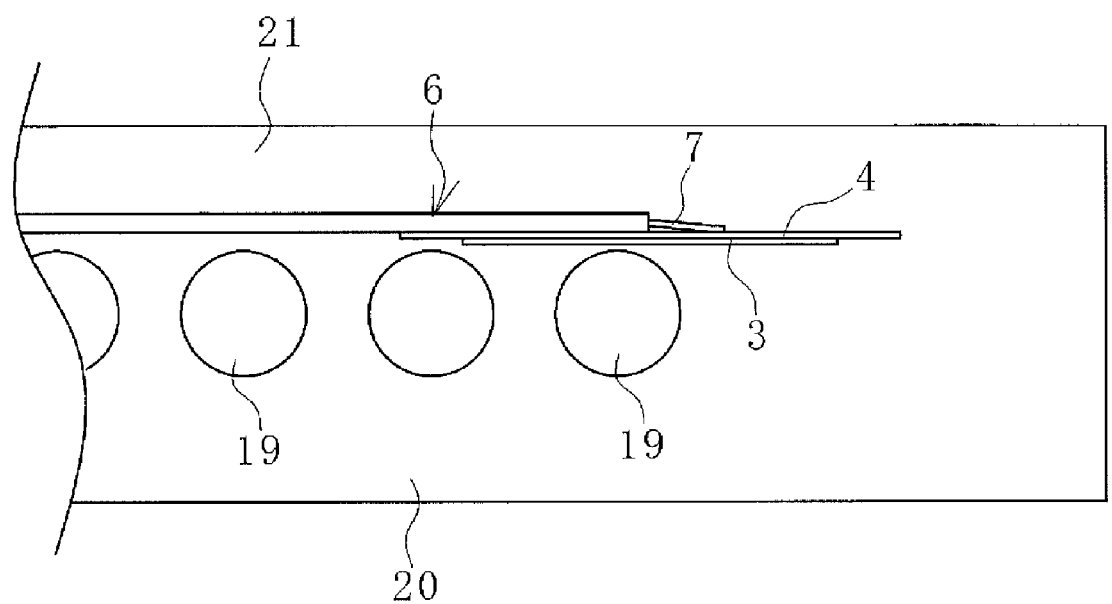
FIG. 5 is an enlarged view of the surroundings of one side antenna unit of FIG. 3.

As illustrated in FIGS. 1 to 3, during operation of the conveyor device 14 (during running of the conveyor belt 17), the radio wave R1 is emitted from the detector 10 toward the other side antenna unit 5. When the embedded body 2 is in an undamaged condition, the radio wave R1 is input to the IC tag 3 through the other side antenna unit 5, the coaxial cable 6, and the one side antenna unit 4. The IC tag 3 emits the radio wave R2 in response to the input radio wave R1. The radio wave R2 is emitted toward the detector 10 through the one side antenna unit 4, the coaxial cable 6, and the other side antenna unit 5. The detector 10 receives the radio wave R2 and thus acquires the information stored in the IC tag 3 and transmitted with the radio wave R2. The information acquired by the detector 10 is input to the calculation unit 12.

Meanwhile, in a case where a vertical tear has been generated in the conveyor belt 17, the coaxial cable 6 breaks in the region where the vertical tear has been generated. Accordingly, even when the radio wave R1 is emitted from the detector 10 toward the other side antenna unit 5, the IC tag 3 does not emit the radio wave R2 in response to the radio wave R1. Consequently, the radio wave R2 is not received by the detector 10, and the information acquired by the detector 10 is not input to the calculation unit 12.

The calculation unit 12 determines whether the detector 10 has received the radio wave R2, based on whether information is input from the detector 10. When the information is input to the calculation unit 12 from the detector 10, it is determined that the detector 10 has received the radio wave R2. In the case of this determination result, it is assumed that the embedded body 2 is in an undamaged condition, and it is determined that there is no vertical tear generated in the region where the coaxial cable 6 is embedded (the generation of a vertical tear is not detected).

When no information is input to the calculation unit 12 from the detector 10, it is determined that the detector 10 has not received the radio wave R2. In the case of this determination result, it is assumed that the coaxial cable 6 has broken, and it is determined that there is a vertical tear generated in the region where the coaxial cable 6 is embedded (the generation of a vertical tear is detected).

When the generation of a vertical tear is detected, the warning device 13 is activated, and the generation of a vertical tear is notified to the surroundings. Since the embedded position of each IC tag 3 in the conveyor belt 17 is stored in the calculation unit 12, the embedded position of the IC tag 3 whose specific information cannot be acquired is determined. Consequently, the position (region) of the conveyor belt 17 in which a vertical tear has been generated can be identified.

The administrator who has recognized the generation of a vertical tear stops running of the conveyor belt 17 at an appropriate timing and handles the vertical tear, for example, by repairing the region in which the vertical tear has been generated. Running of the conveyor belt 17 is resumed after such handling is completed.

The detection device 1 has a simple structure in which the embedded body 2 includes the IC tag 3, which is passive, the coaxial cable 6, and the one side antenna unit 4 and the other side antenna unit 5 connected to both the end portions of the coaxial cable 6. Thus, the embedded body 2 can be formed of general-purpose parts, which is advantageous to reduce costs. Further, the detector 10 may have specifications that allow wireless communication with the embedded body 2 and thus can be formed of general-purpose parts, which is advantageous to reduce costs.

Furthermore, at the position in which a vertical tear has been generated in the conveyor belt, the coaxial cable 6 breaks. Accordingly, even when the radio wave R1 is transmitted from the detector 10 toward the other side antenna unit 5, the radio wave R2 is not emitted from the IC tag 3 in response to the radio wave R1. As a result, whether a vertical tear has been generated can be accurately determined based on whether the detector 10 has received the radio wave R2 emitted through the other side antenna unit 5. In association with the cost reduction of the embedded bodies 2, the embedding pitch P of the embedded bodies 2 with respect to the conveyor belt 17 can be sufficiently decreased under the predetermined cost restriction compared to a conventional loop antenna or the like, which is advantageous to accurately detect whether a vertical tear has been generated.

In another embodiment of the detection device 1 illustrated in FIGS. 8 and 9, a tag side detector 11 is added to the foregoing embodiment. Other configurations are substantially the same as those in the foregoing embodiment.

The tag side detector 11 is disposed at a position near the conveyor belt 10 to wirelessly communicate with the embedded bodies 2 without making contact with the conveyor belt 17. The tag side detector 11 includes a transmission unit of a radio wave R3 and a reception unit of a radio wave R4. The tag side detector 11 emits the radio wave R3 toward the one side antenna unit 4. Additionally, the tag side detector 11 receives the radio wave R4 emitted from the IC tag 3 through the one side antenna unit 4 in response to the radio wave R3 and acquires information that is stored in the IC tag 3 and transmitted with the radio wave R4. Note that the frequency of the radio waves R3, R4 preferably differs from the frequency of the radio waves R1, R2.

The commonly distributed specifications that allow wireless communication with a passive RFID tag or the like are adopted for the tag side detector 11 as in the case of the detector 10. The tag side detector 11 and the detector 10 may have the same specifications. Thus, the IC tag 3 and the tag side detector 11 form a Radio Frequency IDentification (RFID) system.

In this embodiment, the tag side detector 11 is disposed on the return side of the conveyor device 14, but may be disposed on the carrier side. The distance between the tag side detector 11 and the one side antenna unit 4 when the one side antenna unit 4 comes closest to the tag side detector 11 is set, for example, 1 m or less. In other words, the tag side detector 11 is preferably placed at a position where the distance between the tag side detector 11 and the one side antenna unit 4 is 1 m or less when the one side antenna unit 4 passes in front of the tag side detector 11. The information acquired by the tag side detector 11 is input to the calculation unit 12.

For example, in a case where the IC tag 3 has a failure while the coaxial cable 6 is not broken, even when the radio wave R1 is emitted from the detector 10, the radio wave R2 is not emitted from the IC tag 3 in response to the radio wave R1. Accordingly, in the foregoing embodiment, there is a risk that it could be determined that a vertical tear has been generated even when the coaxial cable 6 is not broken. In order to avoid such a wrong detection, in this embodiment, the calculation unit 12 determines the intensity degree of reception by the tag side detector 11 of the radio wave R4 emitted from the IC tag 3 through the one side antenna unit 4 in response to the radio wave R3.

In the case where the IC tag 3 is damaged, even when the radio wave R3 is emitted from the tag side detector 11 toward the one side antenna unit 4, the IC tag 3 does not emit the radio wave R4 in response to the radio wave R3. Consequently, the radio wave R4 is not received by the tag side detector 11, and the information acquired by the tag side detector 11 is not input to the calculation unit 12. As a result, when the calculation unit 12 determines that the tag side detector 11 has not received the radio wave R4 (the reception intensity of the radio wave R4 is zero), it is determined that the IC tag 3 has been damaged.

Meanwhile, in a case where the IC tag 3 is in an undamaged condition and the coaxial cable 6 is broken, the intensity of the radio wave R4 emitted from the IC tag 3 in response to the radio wave R3 changes (becomes weak) compared to a case where the coaxial cable 6 is in an undamaged condition. Accordingly, such characteristics of changing in the intensity of the radio wave R4 are used.

The intensity (reference intensity) of the radio wave R4 emitted from the IC tag 3 in response to the radio wave R3 when the coaxial cable 6 is in an undamaged condition is determined and stored in the calculation unit 12 in advance. Then, the reference intensity is compared with the intensity of the radio wave R4 emitted from the IC tag 3 in response to the radio wave R3 and received by the tag side detector 11, and whether the coaxial cable 6 is broken can be determined based on the comparison result. In a case where the intensity of the radio wave R4 received by the tag side detector 11 is weaker than the reference intensity, it is determined that the coaxial cable 6 is broken. Thus, by a combination of determination of whether the radio wave R2 has been received by the detector 10 and determination of the intensity degree of reception of the radio wave R4 by the tag side detector 11, breaking of the coaxial cable 6 can be more reliably determined. This is advantageous for accurate detection of generation of a vertical tear.

In the above-described manner, a damaged state of the coaxial cable 6 or a damaged state of the IC tag 3 can be determined based on the determination result of the intensity degree of reception of the radio wave R4 by the tag side detector 11. The embedded body 2 is a consumable, the life span of which expires in a certain period of time. By using the tag side detector 11, the embedded body 2 not in an undamaged condition and the embedded position thereof can be determined, which is highly beneficial in efficiently performing maintenance for the embedded body 2.

The one side antenna unit 4 and the other side antenna unit 5 can each protrude outward in the width direction W from the steel cord 19 disposed on the outermost end side in the width direction W. In such a structure, the radio waves used for wireless communication are less likely to be affected by the core layer 18 (steel cords 19), and the wireless communication distance to the detector 10 or the tag side detector 11 can be increased in some cases.

Figure 12:
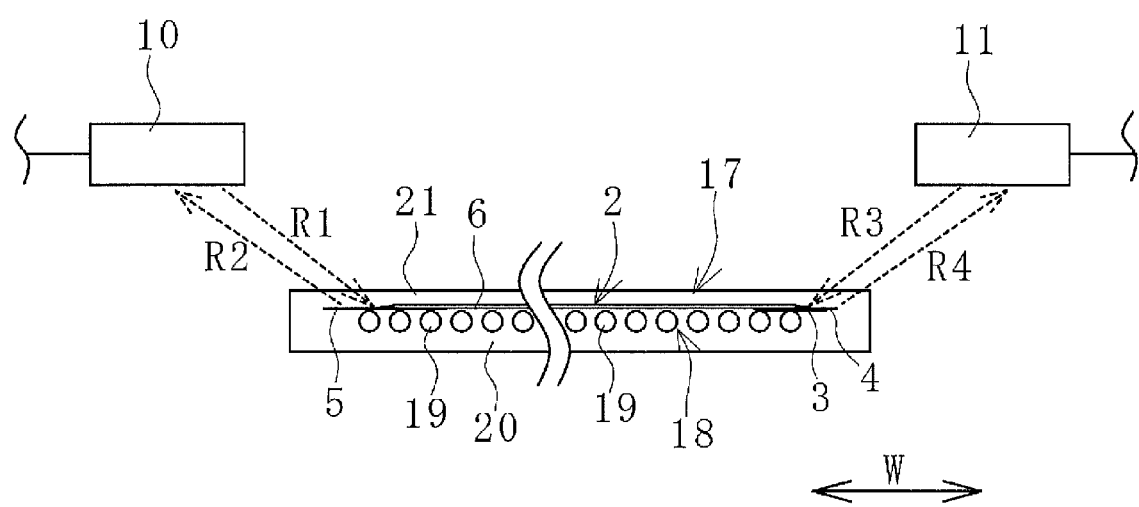
FIG. 12 is an explanatory diagram illustrating a modified example of the placement of a detector in a cross-sectional view of the conveyor belt.

In each of the embodiments described above, the detector 10 and the tag side detector 11 are each disposed at a position on an inner side in the width direction W of the conveyor belt 17, but may be disposed at a position on an outer side in the width direction W of the conveyor belt 1 as illustrated in FIG. 12. A sufficient space for placing the detector 10 and the tag side detector 11 is not ensured inside the conveyor device 14 in some cases. Under such a condition, the detector 10 and the tag side detector 11 are preferably disposed in an open space outside the conveyor belt 17. With such an arrangement, maintenance work for the detector 10 and the tag side detector 11 can be easily performed.

Figure 13:
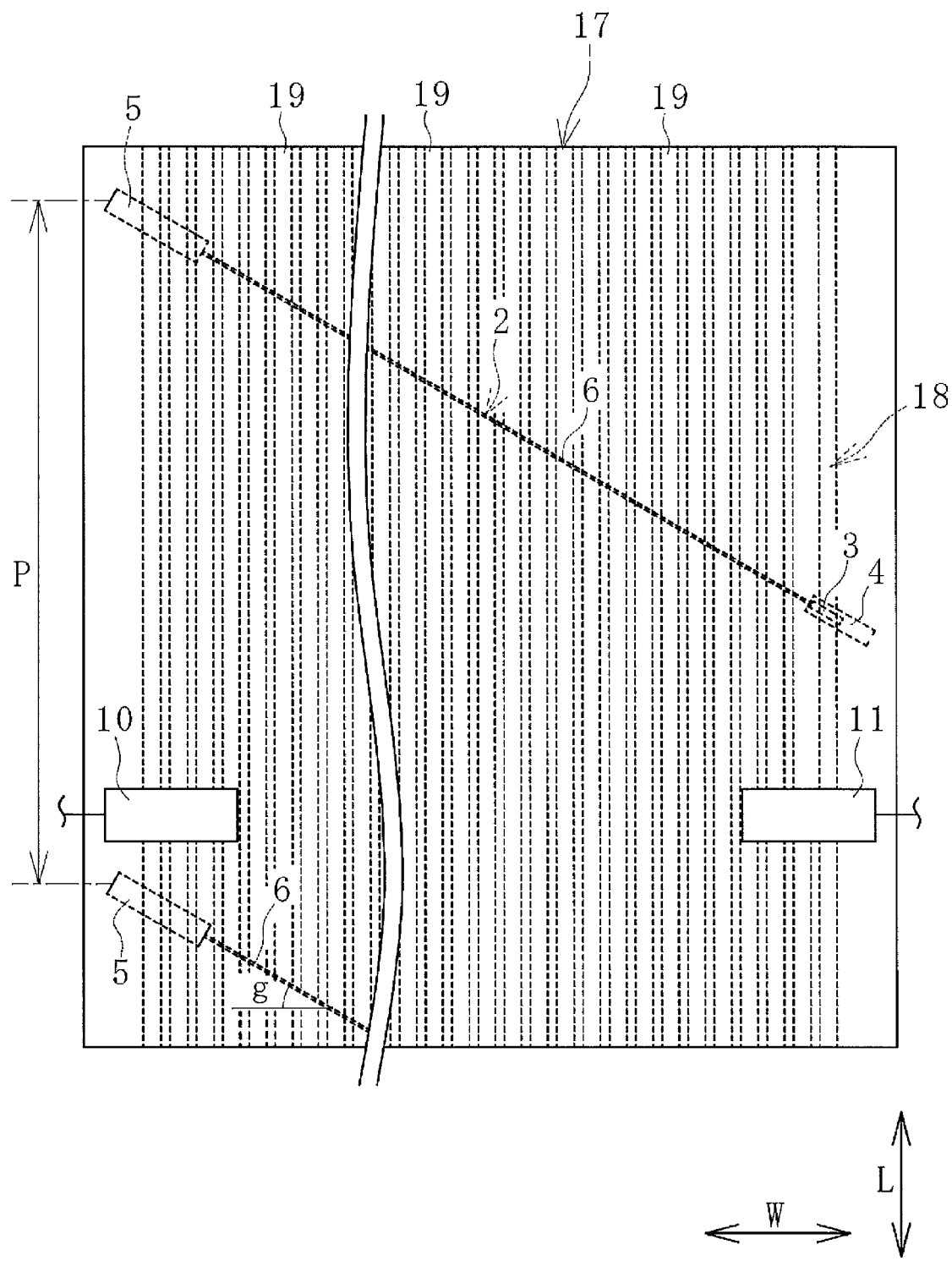
FIG. 13 is an explanatory diagram illustrating a modified example of the embedded body in an embedded state in a plan view of the conveyor belt.

The coaxial cable 6 can extend parallel to the width direction W, but may extend inclined with respect to the width direction W as illustrated in FIG. 13. In FIG. 13, the coaxial cable 6 extends at an inclination angle g of −30° with respect to the width direction W. Note that in FIG. 13, a negative inclination angle means downward-sloping, and a positive inclination angle means upward-sloping.

For example, the coaxial cable 6 can extend at an inclination angle g of +45° or smaller and −45° or smaller with respect to the width direction W. The coaxial cable 6 extends inclined with respect to the width direction W, which is advantageous in further reducing a change in bending rigidity (smoothly changing bending rigidity) when the conveyor belt 17 passes the surroundings of the pulleys 15a, 15b, compared to a case where the inclination angle g is zero.

REFERENCE SIGNS LIST

1 Detection device
2 Embedded body
3 IC tag
4 One side antenna unit
4a, 4b Antenna plate
5 The other side antenna unit
5a, 5b Antenna plate
6 Coaxial cable
7 Core wire (inner conductor)
8 Insulating layer
9 Outer conductor layer
10 Detector
11 Tag-side detector
12 Calculation unit
13 Warning device
14 Conveyor device
15a, 15b Pulley
16 Support roller
17 Conveyor belt
18 Core layer
19 Steel cord
20 Upper cover rubber
21 Lower cover rubber
C Conveyed object

The invention claimed is:

1. A detection device for a vertical tear in a conveyor belt, the detection device comprising:
an embedded body embedded in the conveyor belt;
a detector configured to wirelessly communicate with the embedded body without making contact with the conveyor belt; and
a calculation unit connected to the detector,
the embedded body comprising an IC tag being passive, one side antenna unit connected to the IC tag, a coaxial cable having first and second end portions with the one side antenna unit connected to only the first end portion, and the other side antenna unit connected to only the second end portion of the coaxial cable,
the IC tag and the one side antenna unit, and the other side antenna unit being disposed with an interval in a width direction of the conveyor belt, and the coaxial cable extending in the width direction of the conveyor belt,
the detector being configured to emit a radio wave toward the other side antenna unit, and
the calculation unit being configured to first determine whether the detector has received a radio wave emitted, in response to the radio wave emitted by the detector, from the IC tag through the coaxial cable and the other side antenna unit, and then determine whether a vertical tear has been generated in the conveyor belt in a region where the coaxial cable is embedded being detected based on a result of the first determination.

2. The detection device for a vertical tear in a conveyor belt, according to claim 1, wherein the embedded body is embedded in a lower cover rubber of the conveyor belt.

3. The detection device for a vertical tear in a conveyor belt, according to claim 1, further comprising a tag side detector as the detector, the tag side detector being configured to emit a radio wave toward the one side antenna unit and wirelessly communicate with the embedded body without making contact with the conveyor belt, wherein
the tag side detector is configured to emit a radio wave toward the one side antenna unit, the calculation unit is configured to first determine an intensity degree of reception by the tag side detector of a radio wave emitted, in response to the emitted radio wave, from the IC tag through the one side antenna unit, and then determine a damaged state of the coaxial cable or a damaged state of the IC tag is determined based on a result of the first determination by the tag side detector.

4. The detection device for a vertical tear in a conveyor belt, according claim 1, wherein the embedded bodies are embedded at intervals of 5 m or more and 20 m or less in a longitudinal direction of the conveyor belt.

5. The detection device for a vertical tear in a conveyor belt, according to claim 1, wherein the coaxial cable extends at an inclination angle of +45° or smaller and −45° or smaller with respect to the width direction of the conveyor belt.

6. A method for detecting a vertical tear in a conveyor belt, the method using an embedded body embedded in the conveyor belt, a detector configured to wirelessly communicate with the embedded body without making contact with the conveyor belt, and a calculation unit connected to the detector, the embedded body comprising a first side antenna unit, a second side antenna unit, a coaxial cable having first and second end portions with the first end portion being only connected to the first side antenna unit and the second end portion being only connected to the second side antenna unit, and an IC tag being passive and connected to the one side antenna unit, the first side antenna unit and the IC tag, and the second side antenna unit being disposed with an interval in a width direction of the conveyor belt, and the coaxial cable extending in the width direction of the conveyor belt, and the detection method comprising:

emitting a radio wave from the detector toward the second side antenna unit;

determining by the calculation unit whether the detector has received a radio wave emitted, in response to the emitted radio wave, from the IC tag through the coaxial cable and the second side antenna unit; and detecting based on the determination result whether a vertical tear has been generated in the conveyor belt in a region where the coaxial cable is embedded.

7. A detection device for a vertical tear in a conveyor belt, the detection device comprising:

an embedded body embedded in the conveyor belt;

a detector configured to wirelessly communicate with the embedded body without making contact with the conveyor belt;

a tag side detector as the detector, and a calculation unit connected to the detector, the embedded body comprising an IC tag being passive, one side antenna unit connected to the IC tag, a coaxial cable comprising one end portion connected to the one side antenna unit, and the other side antenna unit connected to the other end portion of the coaxial cable, the IC tag and the one side antenna unit, and the other side antenna unit being disposed with an interval in a width direction of the conveyor belt, and the coaxial cable extending in the width direction of the conveyor belt, the detector being configured to emit a radio wave toward the other side antenna unit, the tag side detector being configured to emit a radio wave toward the one side antenna unit and wirelessly communicate with the embedded body without making contact with the conveyor belt, the calculation unit being configured to first determine whether the detector has received a radio wave emitted, in response to the radio wave emitted by the detector, from the IC tag through the coaxial cable and the other side antenna unit, and then determine whether a vertical tear has been generated in the conveyor belt in a region where the coaxial cable is embedded being detected based on a result of the first determination, and the tag side detector is configured to emit a radio wave toward the one side antenna unit, the calculation unit is configured to first determine an intensity degree of reception by the tag side detector of a radio wave emitted, in response to the emitted radio wave, from the IC tag through the one side antenna unit, and then determine a damaged state of the coaxial cable or a damaged state of the IC tag is determined based on a result of the first determination by the tag side detector.

* * * * *